US008197741B2

(12) United States Patent
Tsuda et al.

(10) Patent No.: US 8,197,741 B2
(45) Date of Patent: Jun. 12, 2012

(54) METHOD FOR PRODUCING CLAY THIN FILM

(75) Inventors: Hajime Tsuda, Shizuoka (JP); Tomohito Inoue, Shizuoka (JP); Katsumi Motegi, Shizuoka (JP); Takeo Ebina, Sendai (JP); Fujio Mizukami, Tagajo (JP)

(73) Assignee: Tomoegawa Co., Ltd., Tokyo (JP)

( * ) Notice: Subject to any disclaimer, the term of this patent is extended or adjusted under 35 U.S.C. 154(b) by 940 days.

(21) Appl. No.: 12/067,338

(22) PCT Filed: Sep. 19, 2006

(86) PCT No.: PCT/JP2006/318490
§ 371 (c)(1),
(2), (4) Date: Mar. 19, 2008

(87) PCT Pub. No.: WO2007/034772
PCT Pub. Date: Mar. 29, 2007

(65) Prior Publication Data
US 2009/0239037 A1 Sep. 24, 2009

(30) Foreign Application Priority Data
Sep. 22, 2005 (JP) ................................. 2005-275533

(51) Int. Cl.
*B27N 3/18* (2006.01)
(52) U.S. Cl. ........ 264/319; 264/1.12; 264/2.7; 264/119; 264/293; 264/332; 501/141
(58) Field of Classification Search .................. None
See application file for complete search history.

(56) References Cited

U.S. PATENT DOCUMENTS

| 4,851,021 | A | * | 7/1989 | Bohrn et al. .................. 65/17.1 |
| 5,336,348 | A | | 8/1994 | Mindler | |
| 6,849,145 | B2 | * | 2/2005 | Yamana et al. ............ 156/89.12 |
| 7,799,395 | B2 | * | 9/2010 | Ebina et al. .................. 428/35.1 |
| 7,898,636 | B2 | * | 3/2011 | Inoue et al. .................... 349/158 |
| 2009/0120326 | A1 | * | 5/2009 | Inoue et al. .............. 106/287.17 |
| 2009/0202806 | A1 | * | 8/2009 | Ebina et al. .................... 428/220 |
| 2009/0239037 | A1 | * | 9/2009 | Tsuda et al. .................... 428/148 |
| 2009/0274860 | A1 | * | 11/2009 | Ebina et al. ................... 428/64.1 |

FOREIGN PATENT DOCUMENTS

| EP | 1 679 285 A1 | 7/2006 |
| JP | 6-293012 A | 10/1994 |
| JP | 2005-104133 A | 4/2005 |
| KR | 10-2002-0005330 | 1/2002 |
| WO | 2005/023714 A1 | 3/2005 |
| WO | WO 2005023714 A1 * | 3/2005 |

OTHER PUBLICATIONS

Japanese Patent Office, International Search Report in International Patent Application No. PCT/JP2006/318490 dated Nov. 14, 2006.
Korean Patent Office, Office Action in Korean Patent Application No. 10-2008-7009417, dated Jan. 18, 2010.
European Search Report issued in Patent Application No. 06798101.9, dated Dec. 14, 2011, 11 pages.
Database WPI, Week 200525, Thomson Scientific, London, GB; AN 2005-242099, XP002665116.
Takeo Ebina, 'Development of Heat-Resist Gas Barrier Films "Claist"', Material Stage, vol. 4, No. 11, dated 2005, pp. 64-67.
Takeo Ebina, Development of "Claist", a Flexible, Heat-Resistant Inorganic Film', AIST Today, vol. 5, No. 6, dated 2005, p. 9.

\* cited by examiner

*Primary Examiner* — Christina Johnson
*Assistant Examiner* — Benjamin Schiffman
(74) *Attorney, Agent, or Firm* — Wood, Herron & Evans, LLP

(57) ABSTRACT

A method for producing a clay thin film, which is formed of clay alone or in combination with an additive and has a structure where oriented clay particles are laminated, the method including paste-making in which clay alone or in combination with an additive are dispersed in a dispersion medium formed of water, an organic solvent, or a mixed solvent of water and an organic solvent to prepare clay paste; coating in which a thin film is formed by coating the clay paste on a substrate; planarization in which the thin film is planarized; drying in which water, an organic solvent, or water and an organic solvent are removed from the thin film; and separation in which the thin film is separated from the substrate.

7 Claims, No Drawings

METHOD FOR PRODUCING CLAY THIN FILM

TECHNICAL FIELD

The present invention relates to a clay thin film having a structure where oriented clay particles are laminated and the production method thereof. In particular, the present invention relates to the production method which improves surface flatness of the clay thin film.

BACKGROUND

Clay thin films have excellent flexibility, and have highly excellent gas and liquid barrier properties since the clay particles are densely oriented in layers (refer to Patent Document 1). Moreover, they are also excellent in terms of heat resistance and nonflammability. By taking advantage of these characteristics, it is expected that the clay thin films that are transparent can be used as a film substrate for liquid crystal and organic electroluminescence (EL) displays.

When the clay thin film is used as a film substrate for an organic EL display for example, a transparent conductive film followed by an organic EL device are laminated on the clay thin film. When the surface of the clay thin film is not flat at the time of lamination, the transparent conductive film cannot be formed uniformly causing reduction in electrical conductivity at the defective parts. Furthermore, the organic EL device is also damaged.

Since the transparent conductive films and organic EL devices are generally formed of thin-film layers that are extremely thin ranging from a few tens to a few hundreds of nanometers, their substrates are required to have excellent surface flatness, for example, a low surface roughness of a few to a few tens of nanometers.

The following method is known as a conventional method to produce clay thin films. Firstly, clay is dispersed in water or a liquid having water as a main component, which is a dispersion medium, to prepare a clay-dispersed solution. This dispersion is allowed to stand horizontally in order to slowly deposit clay particles and also to separate water or the liquid having water as a main component, which is the dispersion medium, by means of solid-liquid separation. Thereby clay forms a film, and thus a clay thin film can be prepared (refer to Patent Document 1). As a method to allow the dispersion to stand, a flat tray made of plastic or a metal is used and the dispersion is poured therein. However, in this case, the surface of the prepared clay thin film which is in contact with the tray has a different surface roughness to as opposed to that of its opposite surface (i.e. the interface with water which is the interface with air after the film is dried). That is, since the surface contacting the tray has a shape which reflects exactly the shape of the contacting tray surface, satisfactory surface flatness is achieved by using a tray with an excellent surface flatness. However, the surface opposite to the surface contacting the tray, that is, the interface with water which is the interface with air after drying, is highly uneven and satisfactory surface flatness is not achieved since it is formed solely by the sedimentation and deposition of clay particles.

[Patent Document 1]
Japanese Laid-Open Patent Application No. 2005-104133

BRIEF SUMMARY OF THE INVENTION

Problems to be Solved by the Invention

As described above, the clay thin film prepared by the conventional production method is inferior in terms of surface flatness. This disadvantage is highly problematic when using the clay thin film, which has excellent gas barrier properties, heat resistance, nonflammability, transparency, and flexibility, as a film substrate for liquid crystal and organic EL displays. The present invention is made in order to solve the above-mentioned problem associated with the prior art. That is, the object of the present invention is to provide a method for producing a clay thin film having a satisfactory surface flatness to be used as a film substrate for liquid crystal and organic EL displays. Another object of the present invention is to provide a clay thin film having the satisfactory surface flatness to be used as the abovementioned film substrate.

DETAILED DESCRIPTION OF THE INVENTION

Means for Solving the Problems

The method of the present invention for producing a clay thin film relates to the production of a clay thin film, which is formed of clay alone or in combination with an additive and has a structure where oriented clay particles are laminated. It is characterized by having a paste-making process in which clay alone or in combination with an additive are dispersed in a dispersion medium, which is formed of water, an organic solvent, or a mixed solvent of water and an organic solvent, to prepare clay paste; a coating process in which a thin film is formed by coating the clay paste on a substrate; a planarization process in which the thin film is planarized; a drying process in which water, an organic solvent, or water and an organic solvent are removed from the thin film; and a separation process in which the thin film is separated from the substrate.

In the present invention, the above substrate has a continuous shape, and it is preferable that the aforementioned coating, planarization, and drying processes are continuous. The aforementioned planarization process may include a process for applying pressure on the thin film on the substrate or a process for applying heat and pressure on the thin film on the substrate. In the above process for applying heat and pressure on the thin film on the substrate, the pressure may be applied by a smoothing roll treatment, or by the adoption of a thermal calendar treatment, a super calendar treatment, or a drying roll treatment. In addition, the degree of surface flatness of the roll used in the planarization process is preferably 100 nm or less in terms of surface roughness Ra, and the aforementioned substrate preferably has a surface roughness Ra of 100 nm or less.

The clay thin film of the present invention is formed from clay alone or in combination with an additive, and has a structure where oriented clay particles are laminated. The clay thin film is characterized by its surface roughness Ra of 100 nm or less. In the present invention, the value of the maximum height Ry of the clay thin film is preferably 500 nm or less, and it is also preferable that the transparency of the clay thin film is 80% or more in terms of the total light transmission and also 5% or less in terms of the haze. The clay thin film may have a continuous shape. The clay thin film of the present invention can be prepared by the production method of the present invention described above.

In the production method of the present invention, although paste-making, coating, planarization, drying, and separation are the essential processes, the order of these processes may be changed where appropriate. For example, the processes may be carried out in the order of paste-making, coating, planarization, drying, and separation, or in the order of paste-making, coating, drying, planarization, and separation. Moreover, the same process may be carried out more than once, for example, paste-making, coating, planarization, and drying processes may be followed by the planarization and separation processes. Furthermore, planarization and drying processes or coating and planarization processes may be carried out simultaneously.

Next, each process will be described in further detail.

(Paste-Making Process)

In the present invention, the term clay paste refers to the dispersion in which clay alone or in combination with an additive are dispersed in a dispersion medium, which is formed of water, an organic solvent, or a mixed solvent of water and an organic solvent, and the dispersion has a solid content (hereinafter referred to as the "solid-liquid ratio") of 0.1 to 90 weight %. More preferably, the solid-liquid ratio is 1 to 60 weight %. The optimum value of solid-liquid ratio is determined appropriately within the abovementioned range depending on the type of clay, the type of solvent, and the coating or the drying process.

The clay used in the present invention forms a clay thin film having a structure where layers of oriented clay particles are laminated. Examples of such clay include natural clay or synthetic clay, and preferably at least one of mica, vermiculite, montmorillonite, iron montmorillonite, beidellite, saponite, hectorite, stevensite, and nontronite, and more preferably natural smectite, synthetic smectite, or a mixture thereof. It is preferable to use synthetic clay in order to obtain a clay thin film having optical properties such as transparency that are required for the display substrates.

The additive which is dispersed with clay is not particularly limited. However, examples thereof include epsilon-caprolactam, dextrin, starch, cellulose-based resin, gelatin, agar, wheat flour, gluten, alkyd resin, polyurethane resin, epoxy resin, fluororesin, acrylic resin, methacrylic resin, phenolic resin, polyamide resin, polyester resin, polyimide resin, polyvinyl-based resin, polyethylene glycol, polyacrylamide, polyethylene oxide, proteins, deoxyribonucleic acids, ribonucleic acids, polyamino acids, polyphenols, and benzoic acids. One or more of these compounds are used.

In the present invention, the clay paste may be aqueous paste. However, by modifying clay organically and making it hydrophobic, it is also possible to disperse the organically modified clay in an organic solvent and suitably use it as an organic solvent-based clay paste.

Examples of the methods to organically modify clay include a method to introduce an organically modifying agent between the layers of clay mineral by ion exchange. For example, quaternary ammonium salts such as dimethyldistearyl ammonium salt and trimethylstearyl ammonium salt, ammonium salts having a benzyl group or a polyoxyethylene group, phosphonium salts, or imidazolium salts may be used as an organically modifying agent. Clay can be organically modified using its ion exchangeability, for example, cation exchangeability of montmorillonite. Due to this organic modification, the dispersion of clay in an organic solvent is achieved.

In the present invention, a small amount of an auxiliary additive may be added to water, an organic solvent, or a mixed solvent of water and an organic solvent. The aims of adding an auxiliary additive are to change the paste dispersibility, to change the viscosity of clay paste, to change the difficulties in drying clay films, to improve the uniformity of clay thin films, and the like. Examples of the auxiliary additives include organic substances and salts such as acetamide and ethanol.

In the present invention, the organic solvent may be formed of one organic solvent or a mixed solvent of plural organic solvents. Examples of the organic solvent used include, although depending on the state of organically modified clay, aromatic hydrocarbons such as benzene and toluene, ethers such as tetrahydrofuran, ketones such as acetone and methyl ethyl ketone, alcohols, halogenated hydrocarbons, dimethylformamide, and ethyl acetate. However, the organic solvent is not limited to the above examples.

Examples of the methods for preparing clay paste include a method in which clay alone or in combination with an additive are added to a dispersion medium, which is formed of water, an organic solvent, or a mixed solvent of water and an organic solvent, and are dispersed by shaking, and then the dispersion medium is slowly evaporated under a mild drying condition, for example at a condition of 50° C., to enhance the solid-liquid ratio until the set value is achieved. In addition, it is also possible to adopt a method in which a clay dispersion is prepared in advance by adjusting the amount of clay alone or in combination with an additive in order to achieve a predetermined solid-liquid ratio, and then the dispersion is subjected to a further dispersion treatment using a paint shaker, a sand mill, a pearl mill, a ball mill, an attritor, a roll mill, a high speed impeller disperser, a jet mill, a high speed impact mill, an ultrasonic disperser, or the like.

Before the coating process, it is preferable that the obtained clay paste is filtered using filters, sieves, or metallic gauzes, or being subjected to a treatment such as centrifugation and precipitation in order to separate and remove aggregates and foreign substances.

(Coating Process)

The clay paste prepared as described above is then coated on a substrate. A method for coating the clay paste on a substrate is not particularly limited as long as it is capable of uniform coating. For example, coating methods such as air doctor coating, blade coating, knife coating, reverse coating, transfer roll coating, gravure roll coating, kiss coating, cast coating, spray coating, slot orifice coating, calendar coating, electrodeposition coating, dip coating, and die coating, and printing methods including relief printing such as flexographic printing, intaglio printing such as direct gravure printing and offset gravure printing, planographic printing such as offset printing, and stencil printing such as screen printing can be used. In addition, it is also possible to perform manual coating using a spatula, a brush or other tools so as to prevent air bubbles. Moreover, the abovementioned coating method is also capable of making the coated surface flat while coating the clay paste.

A substrate to be used is not limited in terms of its material or its thickness as long as it is a sheet substrate having a flat surface. However, a plastic sheet substrate having a thickness of 50 μm to 1 mm is preferable. In addition, the substrate is preferably a continuous sheet. Examples of the substrate materials include polyethylene terephthalate, polyethylene naphthalate, triacetyl cellulose, polyarylate, polyimide, polyether, polycarbonate, polysulfone, polyethersulfone, cellophane, aromatic polyamide, polyethylene, polypropylene, and polyvinyl alcohol. It is also possible to subject the surface of these plastic sheets to a release agent treatment in order to improve the release properties of clay thin films, or to a surface treatment such as a corona treatment and a plasma treatment or an easy-adhesion treatment in order to improve adhesion with the clay paste and wettability. Since the surface flatness of the substrate affects the surface flatness of the clay thin film to be prepared, the substrate preferably has a surface roughness Ra of 100 nm or less and more preferably 50 nm or less.

The coating thickness of clay paste is generally 30 μm to 10 mm and is preferably 0.1 mm to 1 mm. When the coating thickness is too small, it is possible that the mechanical strength of the clay thin film is not satisfactory. On the other hand, when the coating thickness is too large, it will result in the long drying time in the later process, and thus not preferable.

The thickness of the clay thin film of the present invention can be controlled to any thickness by adjusting the solid-liquid ratio or the coating thickness of clay paste, the solvent used, or the like. However, the thickness is generally 10 μm to 2 mm and is preferably 50 μm to 300 μm. When the thickness of clay thin films is too small, it is possible that the film strength is reduced resulting in unsatisfactory mechanical strength. On the other hand, when the thickness is too large, it will result in, for example, long drying time at the time of production leading to low productivity, and thus is not preferable.

(Planarization Process)

Next, planarization of the clay paste film prepared on a substrate is carried out in the planarization process. The planarization can be performed by, for example, a method to heat the clay paste film and then apply pressure on the surface of the clay paste film, a method to carry out a smoothing roll treatment after the coating of clay paste, a method to apply a mirror finish in the drying process, a method to treat the film by passing through a multicylinder dryer roll or a Yankee dryer roll that is planarized, and other methods.

For example, for the treatment carried out by applying pressure and heat on the surface of a clay paste film, planarization methods used in the paper processing technology, such as thermal calendar and super calendar treatments, can be used. With the thermal calendar treatment, it is possible to achieve easy planarization due to the removal of water contained in the clay film or the reduction in melt viscosity of an added resin in high-temperature regions, since heat can be applied in addition to the planarization by the roll pressure. With the super calendar treatment, by adjusting the number of rolls, the number of nips, nip pressure, or the like and also by treating a self contained clay thin film, which is the clay thin film after being separated from the substrate, it is possible to planarize both sides of the film at the same time to achieve two surfaces with equivalent surface flatness. In either case, it is required that the surface of the calendar roll used has a certain degree of flatness and is preferably 100 nm or less in terms of surface roughness Ra. The roll surface with such surface flatness can be planarized by mirror finish, polishing, or other methods. Note that surface flatness is important with calendar rolls, although the materials thereof are not particularly limited.

In addition, it is also possible to use a general heat press machine as a means of applying heat and pressure. As the heat press machine, an apparatus which is capable of applying heat and pressure by the use of a roll, a batch heat press machine, or the like can be used. In order to achieve a continuous clay thin film, it is preferable to use an apparatus which applies heat and pressure by the use of a roll. It is also possible to cut out a piece of clay thin film of a certain size from the continuous clay thin film and subject the piece to a further batch-wise pressing treatment using a heat press machine in order to improve the surface planarization. Part of the heat press machine which contacts the surface of a clay paste film, that is, the press plate preferably has a surface roughness Ra of 100 nm or less. The clay paste film on a substrate will have a uniform film thickness and a small surface roughness due to the application of pressure by a heat press machine.

The above treatment by a heat press machine is preferably carried out in a vacuum. By performing the treatment in a vacuum, it is possible to reduce the extent of voids inside a clay thin film and achieve a denser clay film.

As another method to planarize the surface coated with clay paste, a method employing a smoothing roll treatment and other methods can be adopted. For example, immediately after coating clay paste on the substrate surface by an appropriate coating method, it is possible to improve surface flatness by smoothing the surface coated with clay paste using a smoothing roll. A heated smoothing roll can also be used. When it is used, the temperature of the clay paste on the coated surface rises instantly, and thus disproportionate deposition of additives in the coating solution are reduced due to the reduction in viscosity, and at the same time, the coated surface can be planarized satisfactorily due to a synergistic effect as a result of contact with the smoothing roll.

When the viscosity of clay paste is high, planarization is not achieved at times even when the smoothing treatment by a smoothing roll is performed. In such a case, it is also possible to improve surface flatness by coating clay paste, which has a reduced solid-liquid ratio compared to that of the clay paste coated on a substrate or which has a different solvent or formulation, for the second time on the coated surface followed by a smoothing treatment.

When carrying out the mirror finish in the drying process, drying and surface planarization can be conducted simultaneously. For example, drying and surface planarization can be performed simultaneously by contacting dryer rolls such as a multicylinder dryer or a Yankee dryer which are used in paper making machines. When a heat roll with high surface flatness is used, by coating clay paste on a substrate and embracing the resulting product by a dryer roll for contact, the dispersion medium contained in the product such as water and an organic solvent is removed and at the same time, the coated surface can be planarized. It is preferable that the dryer roll is a multicylinder dryer roll since drying efficiency improves and the planarization accelerates due to the increase in the frequency the film passes through the dryer roll.

In the present invention, it is also possible to combine the above-mentioned planarization methods or other planarization methods for use. Moreover, by appropriately adjusting the factors such as the roll materials used, applied pressure, heating temperature, feeding speed and frequency, clay paste viscosity, and the solvent used, any degree of flatness can be achieved.

(Drying Process and Separation Process)

The drying process is not particularly limited as long as it can remove water, organic solvents, and other liquid components contained in the coated film. For example, when drying is conducted in a forced convection oven, as for the drying condition, temperature is 30° C. to 100° C. and preferably 50° C. to 70° C. However, it is also possible to carry out drying in an open system by supplying heat from the surrounding heat sources. Drying can also be performed using heat radiation such as infrared. In addition, as mentioned in the section on planarization process, planarization and drying processes can also be carried out simultaneously due to the contact with a dryer roll. In the drying process, it may take a long time for drying when the drying temperature is too low. On the other hand, when the drying temperature is too high, convection of the liquid components in clay paste and the like and promoted due to rapid drying leading to a possible loss of film uniformity.

In the separation process, the clay thin film of the present invention obtained by the abovementioned drying procedure is separated from the substrate. The clay thin film can readily be separated from the substrate with small mechanical strength. When the separation is not easy, a short-time heat treatment at a temperature of about 80° C. to 300° C. will achieve easy separation. In addition, it is also possible to conduct a surface treatment in advance such as a releasing treatment, a corona treatment, a plasma treatment, or an easy-adhesion treatment in order to make the separation of clay thin films easy.

(Clay Thin Film)

In the clay thin film of the present invention, compounding ratio of clay is preferably 70 weight % to 100 weight %. When a film with heat resistance and durability at high temperatures is required, the clay compounding ratio is preferably closer to 100 weight %. When a film with flexibility, transparency, or the like is required, the amount of additive, which is added to clay for supplying such functions, may be increased. The clay compounding ratio may be adjusted appropriately within the abovementioned range by taking the balance among the factors such as heat resistance, flexibility, and transparency, into consideration.

The clay thin film of the present invention can be prepared by the abovementioned method and has a structure where oriented clay particles are laminated. It is required that the clay thin film of the present invention has a surface roughness Ra of 100 nm or less. In order to use the clay thin film as a film substrate for liquid crystal and organic EL displays, Ra is preferably 100 nm or less, more preferably 50 nm or less, and particularly preferably 10 nm or less.

Additionally, the surface of the clay thin film of the present invention is preferably 500 m or less in terms of the Ry value which is the maximum height representing the height of peaks and troughs. More preferably, Ry is 100 nm or less. This is because the Ra value may not reflect the presence of major defects such as protrusions since Ra represents the arithmetic mean surface roughness, and these defects become apparent when clay thin films are used as a film substrate and when a transparent conductive film or an organic EL thin film is laminated thereon.

Note that Ra represents the arithmetic mean surface roughness and it is a value determined by the following equation when extracting a reference length from a roughness curve in a direction of the average line thereof, taking the x-axis in the direction of the average line of this extracted portion and the y-axis in a direction of the longitudinal magnification, and representing the roughness curve as y=f(x).

$$Ra = (1/l) \int_0^l |f(x)| dx$$

(l: reference length)

Ry represents the maximum height and it is a value determined by extracting a reference length from a roughness curve in the direction of its average line and measuring the interval between the crest line and the bottom line of this extracted portion in a direction of the longitudinal magnification of the roughness curve.

The clay thin film of the present invention is required to exhibit a total light transmission of 80% or more and also a haze of 5% or less when used as a substrate for displays. More preferably, the total light transmission is 85% or more and the haze is 1% or less. The haze value can be lowered by suppressing the scattering of light due to the control of unevenness and planarization of the surface of clay thin films. Note that the properties of a clay thin film, that is, a surface roughness Ra of 100 nm or less, a total light transmission of 80% or more, and also a haze of 5% or less, are the properties achieved only by the abovementioned production method of the present invention including the planarization process.

Effects of the Invention

The method of the present invention for producing clay thin films is provided with a planarization process in which the thin films are planarized by the application of heat and pressure on the clay paste coated on a substrate due to the treatments such as a smoothing roll treatment, calendar treatment, and multicylinder dryer treatment. For this reason, the prepared clay thin films have highly improved surface flatness, the area which has been a great problem when using them as a film substrate for liquid crystal and organic EL displays. Accordingly, the clay thin film prepared by the production method of the present invention and which has a surface roughness Ra of 100 nm or less has equivalent optical properties, flexibility, and small thickness compared to those of the plastic substrates used as a film substrate for displays. Moreover, the clay thin film of the present invention is also excellent in terms of nonflammability, heat resistance, and dimensional stability compared to the plastic substrates, and thus will be an excellent material, for example, as a film substrate for liquid crystal and organic EL displays.

BEST MODE FOR CARRYING OUT THE INVENTION

The best mode for carrying out the present invention will be described below based on the following examples. However, the present invention is not limited to these examples.

Example 1

As clay, 1 g of synthetic smectite (Smecton SA manufactured by Kunimine Industries Co., Ltd.) was added to 60 cm$^3$ of distilled water, this was placed into a sealed container made of plastic together with a rotor made of polyethylene fluoride. The resultant was shaken vigorously for 30 minutes at 25° C. to obtain a uniform dispersion. This dispersion was gradually dried at a condition of 50° C. to obtain a clay paste having a solid-liquid ratio of about 6 weight %. The clay paste was coated on a polyethylene terephthalate film, which was used as a substrate and had a surface roughness Ra of 10 nm, by use of an applicator. The coated surface was smoothed by a smoothing roll, which had a surface roughness Ra of 20 nm, and then dried for 5 hours at 60° C. to obtain a clay thin film, which was 100 μm thick and had a structure where oriented clay particles were laminated.

Example 2

A clay thin film, which was 100 μm thick and had a structure where oriented clay particles were laminated, was obtained as in Example 1 except that the smoothing roll was not used and that the film was subjected to a thermal calendar treatment, in which the film was passed through a thermal calendar roll that was heated to 150° C. and had a surface roughness Ra of 20 nm, after the coating and drying processes.

Example 3

A clay thin film, which was 100 μm thick and had a structure where oriented clay particles were laminated, was obtained as in Example 1 except that the smoothing roll was not used and that the planarization was carried out by passing the film through a super calendar roll that had 4 rolls, 3 nips, and a surface roughness Ra of 20 nm, after the coating and drying processes.

Example 4

A clay thin film, which was 100 μm thick and had a structure where oriented clay particles were laminated, was obtained as in Example 1 except that the smoothing roll was not used and that the drying and planarization processes were carried out simultaneously by passing the film through a multicylindrer dryer roll that had a surface roughness Ra of 30 nm, after the coating process.

Example 5

As clay, 1 g of synthetic smectite (Lucentite SPN manufactured by CO-OP Chemical Co., Ltd.) was added to 60 cm$^3$ of toluene. This was placed into a sealed container made of plastic together with a rotor made of polyethylene fluoride. The resultant was shaken vigorously for 30 minutes at 25° C. to obtain a uniform dispersion. This dispersion was gradually dried at a condition of 50° C. to obtain a clay paste having a solid-liquid ratio of about 6 weight %. The clay paste was coated on a polyethylene terephthalate film, which was used as a substrate and had a surface roughness Ra of 10 nm, by use of an applicator. The coated surface was smoothed by a smoothing roll, which had a surface roughness Ra of 20 nm, and then dried for 2 hours at 60° C. to obtain a clay thin film, which was 100 μm thick and had a structure where oriented clay particles were laminated.

Example 6

As clay, 1 g of natural montmorillonite (Kunipia P manufactured by Kunimine Industries Co., Ltd.) was added to 60 cm$^3$ of distilled water. This was placed into a sealed container made of plastic together with a rotor made of polyethylene fluoride. The resultant was shaken vigorously for 30 minutes at 25° C. to obtain a uniform dispersion. This dispersion was gradually dried at a condition of 50° C. to obtain a clay paste having a solid-liquid ratio of about 6 weight %. The clay paste was coated on a polyethylene terephthalate film, which was used as a substrate and had a surface roughness Ra of 10 nm, by use of an applicator. The coated surface was smoothed by a smoothing roll, which had a surface roughness Ra of 20 nm, and then dried for 5 hours at 60° C. to obtain a clay thin film, which was 100 μm thick and had a structure where oriented clay particles were laminated.

Comparative Example 1

As clay, 1 g of synthetic smectite (Smecton SA manufactured by Kunimine Industries Co., Ltd.) was added to 60 cm$^3$ of distilled water. This was placed into a sealed container made of plastic together with a rotor made of polyethylene fluoride. The resultant was shaken vigorously for 30 minutes at 25° C. to obtain a uniform dispersion. This dispersion was gradually dried at a condition of 50° C. to obtain a clay paste having a solid-liquid ratio of about 6 weight %. The clay paste was coated on a polyethylene terephthalate film, which was used as a substrate and had a surface roughness Ra of 10 nm, by use of an applicator. Without a planarization treatment, the resulting product was then dried for 5 hours at 60° C. to obtain a clay thin film, which was 100 μm thick.

Comparative Example 2

As clay, 1 g of natural montmorillonite (Kunipia P manufactured by Kunimine Industries Co., Ltd.) was added to 60 cm$^3$ of distilled water. This was placed into a sealed container made of plastic together with a rotor made of polyethylene fluoride. The resultant was shaken vigorously for 30 minutes at 25° C. to obtain a uniform dispersion. This dispersion was gradually dried at a condition of 50° C. to obtain a clay paste having a solid-liquid ratio of about 6 weight %. The clay paste was coated on a polyethylene terephthalate film, which was used as a substrate and had a surface roughness Ra of 10 nm, by use of an applicator. Without a planarization treatment, the resulting product was then dried for 5 hours at 60° C. to obtain a clay thin film, which was 100 μm thick.

(Evaluation)

The clay thin films prepared in Examples and Comparative Examples were evaluated as follows.

Surface roughness measurement: Ra (arithmetic mean surface roughness) and Ry (maximum height) of the surface of a clay thin film, which was an interface with air after drying, were determined (measuring range was 20×20 μm) using an atomic force microscope (SPM400-AFM manufactured by SII NanoTechnology Inc.).

Optical properties: total light transmission and haze were determined by the measurement made by the use of a haze meter (Haze Meter NDH2000 manufactured by Nippon Denshoku Industries Co., Ltd.).

TABLE 1

|  |  | Ex. 1 | Ex. 2 | Ex. 3 | Ex. 4 | Ex. 5 | Ex. 6 | Comp. Ex. 1 | Comp. Ex. 2 |
| --- | --- | --- | --- | --- | --- | --- | --- | --- | --- |
| Surface roughness Ra | (nm) | 3.4 | 2.5 | 2.7 | 3.0 | 3.5 | 7.3 | 119.0 | 169.0 |
| Maximum height Ry | (nm) | 81 | 58 | 63 | 71 | 87 | 88 | 588 | 1323 |
| Total light transmission | (%) | 91.0 | 90.8 | 90.9 | 91.0 | 92.5 | 88.6 | 89.0 | 88.4 |
| Haze | (%) | 1.5 | 1.0 | 1.2 | 1.3 | 0.7 | 3.2 | 16.9 | 48.7 |

As is apparent from the results shown in the above Table 1, in Examples of the present invention, it was possible to obtain clay thin films having a low surface roughness and a flat surface due to the surface planarization treatment by a smoothing process, a thermal calendar process, a super calendar process, a drying process using a multicylinder dryer, or the like. Moreover, as a result, satisfactory optical properties, a low haze value in particular, were achieved since the scattering of light caused by the surface unevenness was suppressed.

The invention claimed is:
1. A method for producing a clay thin film, which is formed of clay alone or in combination with an additive and has a structure where oriented clay particles are laminated, the method comprising:
   paste-making in which clay alone or in combination with an additive are dispersed in a dispersion medium formed of water, an organic solvent, or a mixed solvent of water and an organic solvent to prepare clay paste;
   coating in which a thin film is formed by coating the clay paste on a substrate;
   planarization in which the thin film is planarized;
   drying in which the water, the organic solvent, or the water and the organic solvent are removed from the thin film; and
   separation in which the thin film is separated from the substrate, wherein the planarization comprises a treatment using a roll having a degree of flatness of 100 nm or less in terms of surface roughness Ra and wherein the total light transmittance of the thin film is not less than 80% and haze is not more than 5%.

2. The method for producing a clay thin film according to claim 1, wherein the substrate has a continuous shape and the coating, planarization, and drying are continuous processes.

3. The method for producing a clay thin film according to claim 1 or 2, wherein the planarization comprises a process for applying pressure on the thin film on the substrate or a process for applying heat and pressure on the thin film on the substrate.

4. The method for producing a clay thin film according to claim 3, wherein the process for applying pressure on the thin film on the substrate is carried out by a smoothing roll treatment.

5. The method for producing a clay thin film according to claim 3, wherein the process for applying heat and pressure on the thin film on the substrate is carried out by a thermal calendar treatment or a super calendar treatment.

6. The method for producing a clay thin film according to claim 3, wherein the process for applying heat and pressure on the thin film on the substrate is carried out by a drying roll treatment.

7. The method for producing a clay thin film according to claim 1, wherein a surface of the substrate adjacent the thin film has a surface roughness Ra of 100 nm or less.

\* \* \* \* \*

UNITED STATES PATENT AND TRADEMARK OFFICE
CERTIFICATE OF CORRECTION

PATENT NO. : 8,197,741 B2  
APPLICATION NO. : 12/067338  
DATED : June 12, 2012  
INVENTOR(S) : Hajime Tsuda et al.

Page 1 of 1

It is certified that error appears in the above-identified patent and that said Letters Patent is hereby corrected as shown below:

On the Title Page, item (73) Assignee, replace "Tomoegawa Co., Ltd., Tokyo (JP)"... with "Tomoegawa Co., Ltd., Tokyo (JP); National Institute of Advanced Industrial Science and Technology, Tokyo, (JP)"...

Signed and Sealed this  
Twelfth Day of March, 2013

Teresa Stanek Rea  
*Acting Director of the United States Patent and Trademark Office*